United States Patent [19]
Batta

[11] 3,717,974
[45] Feb. 27, 1973

[54] SELECTIVE ADSORPTION PROCESS FOR AIR SEPARATION

[75] Inventor: Louis Bela Batta, Grand Island, N.Y.

[73] Assignee: Union Carbide Corporation, New York, N.Y.

[22] Filed: Jan. 24, 1972

[21] Appl. No.: 219,942

Related U.S. Application Data

[63] Continuation-in-part of Ser. No. 103,768, Jan. 4, 1971, Pat. No. 3,636,679, which is a continuation-in-part of Ser. No. 787,847, Dec. 30, 1968, Pat. No. 3,564,816.

[52] U.S. Cl..........................................55/58, 55/62
[51] Int. Cl. ...............................................B01d 53/04
[58] Field of Search............55/25, 26, 58, 62, 74, 75, 55/179, 389, 68

[56] References Cited

UNITED STATES PATENTS

| | | | |
|---|---|---|---|
| 3,176,444 | 4/1965 | Kiyogvaga | 55/62 |
| 3,338,030 | 8/1967 | Feldbauer | 55/62 |
| 3,430,418 | 3/1969 | Wagner | 55/62 |

*Primary Examiner*—Charles N. Hart
*Attorney*—Paul A. Rose et al.

[57] ABSTRACT

Air is separated by selective adsorption of nitrogen in a high performance adiabatic pressure swing process using zeolitic molecular sieve adsorbent by returning at least four times as much oxygen to the absorbent as is introduced in the feed air.

5 Claims, 8 Drawing Figures

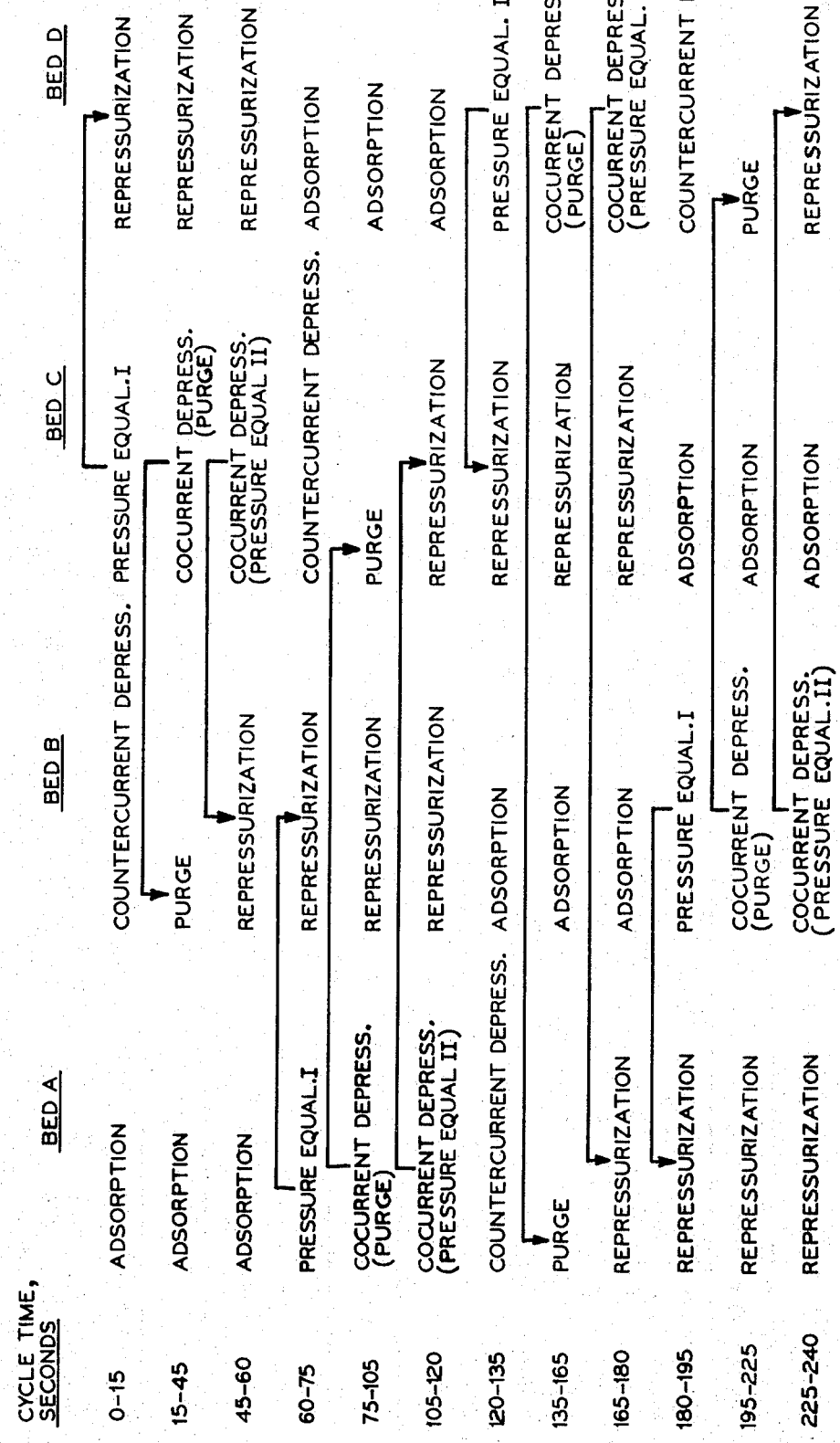

FIG. 5

ADSORBER

| Cycle Time, Seconds | Bed A | Bed B | Bed C | Bed D |
|---|---|---|---|---|
| 0-30 | Adsorption | Repressure | Purge | Cocur. Depress.(P.E.I) |
| 30-45 | Adsorption | Repressure | Repressure | Cocur. Depress.(P.E.II) |
| 45-60 | Adsorption | Repressure | Isolated | Counter. Depress. |
| 60-90 | Cocur. Depress.(P.E.I) | Adsorption | Repressure | Purge |
| 90-105 | Cocur. Depress.(P.E.II) | Adsorption | Repressure | Repressure |
| 105-120 | Counter. Depress. | Adsorption | Repressure | Isolated |
| 120-150 | Purge | Cocur. Depress.(P.E.I) | Adsorption | Repressure |
| 150-165 | Repressure | Cocur. Depress. (P.E.II) | Adsorption | Repressure |
| 165-180 | Isolated | Counter. Depress. | Adsorption | Repressure |
| 180-210 | Repressure | Purge | Cocur. Depress.(P.E.I) | Adsorption |
| 210-225 | Repressure | Repressure | Cocur. Depress.(P.E.II) | Adsorption |
| 225-240 | Repressure | Isolated | Counter. Depress. | Adsorption |

SELECTIVE ADSORPTION PROCESS FOR AIR SEPARATION

CROSS REFERENCE TO RELATED APPLICATION

This application is a continuation-in-part of Ser. No. 103,768 filed Jan. 4, 1971, now U.S. Pat. No. 3,636,679 in the name of Louis B. Batta, which in turn is a continuation-in-part of Ser. No. 787,847 filed Dec. 30, 1968 in the name of Louis B. Batta and issued Feb. 23, 1971 as U.S. Pat. No. 3,564,816.

BACKGROUND OF THE INVENTION

This invention relates to a process for separating air by adiabatic pressure swing adsorption.

In the prior art adiabatic pressure swing processes for air separation, the cycle sequence usually includes a selective adsorption step during which compressed air is introduced at the adsorbent bed inlet end thereby forming a nitrogen adsorption front, nitrogen being selectively adsorbed by most adsorbents as for example, zeolitic molecular sieves. Oxygen is also coadsorbed but substantially displaced by the more strongly held nitrogen adsorbate. Oxygen effluent gas is discharged from the opposite or discharge end of the bed at about the feed air pressure and the nitrogen adsorption front moves progressively toward the discharge end. The adsorption step is terminated when the front is intermediate the inlet and discharge ends, and the bed is cocurrently depressurized with oxygen effluent being released from the discharge end and the nitrogen adsorption front moving into the previously unloaded section closer to the discharge end. The cocurrent depressurization gas may in part be discharged as oxygen product and in part returned to other adsorbent beds for a variety of purposes, e.g., purging and pressure equalization with a purged bed for partial repressurization thereof. Cocurrent depressurization is terminated before the front reaches the discharge end so that the oxygen purity of the effluent is nearly that of the gas discharged during the preceeding adsorption step as for example described more completely in Kiyonaga U.S. Pat. No. 3,176,444.

The cocurrently depressurized bed is usually further depressurized by releasing waste gas through the inlet end, i.e., countercurrently depressurized, until the bed pressure diminishes to a desired low level for purging. Then oxygen purge gas is flowed through the bed to desorb the nitrogen adsorbate and carry same out of the system. The purged and of least partly cleaned bed is then repressurized at least partly with oxygen and/or feed air and returned to the adsorption step. One such process is described in Wagner U.S. Pat. No. 3,430,418, and requires at least four adsorbent beds arranged in parallel flow relation. The Wagner system is capable of recovering about 36 percent of the oxygen introduced in the feed air, and at about 95 mol percent purity.

An object of this invention is to provide an improved adiabatic pressure swing process for air separation which permits higher oxygen recoveries than heretofor attained and with at least equal oxygen purities.

Another object is to provide an adiabatic pressure swing process for air separation with fewer than four adsorbent beds but permitting oxygen recovery and purity at least comparable to the four bed prior art system.

Other objects will be apparent from the ensuing disclosure and appended claims.

SUMMARY

This invention relates to an adiabatic pressure swing process for selectively adsorbing nitrogen from feed air to provide oxygen effluent product.

At least three zeolitic molecular sieve adsorption beds are used in this ambient temperature process with feed air introduced to the inlet end of a first adsorption bed at highest superatmospheric pressure thereby establishing a nitrogen adsorption front near the inlet end. Oxygen effluent is discharged from the opposite or discharge end either simultaneously with the feed air introduction or subsequently thereto, so that the nitrogen adsorption front moves toward the discharge end. At least part of the oxygen effluent is introduced to a previously purged bed. Additional oxygen effluent is thereafter released from the first bed discharge end thereby cocurrently depressurizing the first bed, and such cocurrent depressurization is terminated when the first bed is at lower superatmospheric pressure. Waste gas is then released from the first bed inlet end thereby countercurrently depressurizing same to a lowest superatmospheric pressure. Oxygen gas from another adsorption bed discharge end is introduced to the first bed discharge end as purge gas and flowed therethrough at the lowest superatmospheric pressure of the process for desorption of the nitrogen adsorbate. The nitrogen adsorbate-containing purge gas is discharged from the first bed inlet end as waste gas. Oxygen effluent gas from the discharge end of an other-than-first adsorption bed which is above the lowest superatmospheric pressure is introduced to the purged first bed for at least partial repressurization thereof before reintroduction of feed air. One part of the oxygen effluent gas from the first bed is discharged as product and the balance of this oxygen effluent gas is returned for repressurization and purging of other adsorption beds.

In the improvement of this invention the feed air is introduced to the first bed at highest superatmospheric pressure of 40–105 psia., the cocurrent depressurization is terminated at lower superatmospheric pressure of 16–40 psia. and the feed air to cocurrent depressurization termination pressure ratio is at least 1.5. The oxygen mass relationship of feed gas oxygen : oxygen effluent gas from the first bed discharge end : oxygen return gas is 1:5–13.5: 4–13.1.

BRIEF DESCRIPTION OF THE DRAWINGS

FIG. 4 is a preferred cycle and time program for various steps of a high pressure oxygen product embodiment of this process which can be practiced with the FIG. 3 apparatus.

FIG. 5 is a cycle and time program for various steps of an alternative high pressure oxygen product embodiment which can be practiced with apparatus similar to FIG. 3.

DESCRIPTION OF THE PREFERRED EMBODIMENTS

Figure 1:
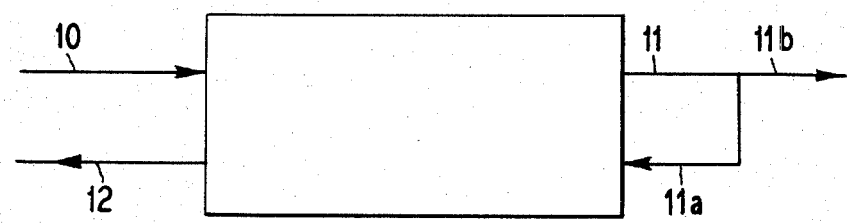
FIG. 1 is a block diagram illustrating the fundamental principles of the invention.

I have discovered that the prior art adiabatic pressure swing processes for air separation may be improved by several innovations one of which is described and claimed in Batta U.S. Pat. No. 3,564,816 with four or more adsorbent beds employed, but two stages of pressure equalization are used between the first bed being cocurrently depressurized and other beds being partially repressurized after having been purged. After having completed its adsorption step at substantially the feed air pressure the first bed is first higher pressure equalized with a different bed at higher intermediate pressure by releasing oxygen effluent gas from the first bed discharge end and flowing same to the different bed discharge end, such bed having previously been repressurized by returned oxygen effluent gas to lower intermediate pressure. A second pressure equalizing step follows wherein additional oxygen effluent gas is released from the first bed discharge end and flowed either cocurrently or countercurrently to a still different bed immediately after the nitrogen adsorbate has been purged therefrom at the lowest pressure level of the process. This flow continues until the two beds are equalized at lower intermediate pressure. The first bed is then purged with oxygen effluent and countercurrently repressurized prior to resumption of the adsorption step. A further portion of oxygen effluent gas is released from the first bed by cocurrent depressurization, either before or after the aforementioned second pressure equalizing step. This further portion is preferably withdrawn after the second pressure equalization and used to purge the other adsorbent bed at the lowest pressure of the process.

For end uses wherein the oxygen product may be supplied at relatively low pressures, the prior art adiabatic pressure swing processes for air separation are also improved by my invention described and claimed in Batta U.S. Pat. No. 3,636,679 to issue Jan. 25, 1972 and based on my parent application Ser. No. 103,768. At least two beds of selective adsorbent material are provided each having inlet and discharge ends, and the feed air is introduced at superatmospheric pressure to the first bed inlet end, the bed having previously been purged of the nitrogen adsorbate and initially at lower pressure. Simultaneously with this feed air introduction, effluent oxygen gas is introduced initially at substantially the first highest superatmospheric pressure to the discharge end of the first bed. Also simultaneously with the feed air - effluent oxygen introduction, effluent oxygen is released from the discharge end of a second adsorbent bed having previously received the feed air at its inlet end in sufficient quantity for a nitrogen adsorption front to have been formed at the inlet end and progressively moved to a position intermediate the inlet and discharge ends. The second bed is initially at substantially the first highest pressure so that the pressure of the released effluent oxygen gas progressively diminishes as the bed is cocurrently depressurized. One part of the so-released effluent oxygen gas is flowed to the first bed discharge end as the aforementioned repressurizing gas and another part is simultaneously discharged as product. The aforementioned gas flows are continued until the gas pressures in the first and second adsorbent beds are substantially equal whereupon the oxygen gas flow from the second to the first bed is terminated. The introduction of the feed air is continued to the first bed inlet end after the oxygen gas flow termination, thereby further repressurizing the first bed to higher pressure above the first-second bed equalization pressure. Effluent oxygen gas is released from the discharge end of the further repressurized first bed and one part thereof is employed for purging the nitrogen adsorbate from the second bed at the lowest pressure or the process. Another part of the released effluent oxygen gas is used to repressurize another adsorbent bed having previously been purged of the nitrogen adsorbate. This gas is introduced to the discharge end of such bed for countercurrent repressurization. Still another part of the released effluent oxygen gas is discharged as product. The first bed is purged of the nitrogen by introducing effluent oxygen gas from a different bed to the discharge end of the first bed for countercurrent flow therethrough at the lowest pressure.

This invention represents another improvement over the prior art adiabatic pressure swing processes permitting high performance—greater than 80 percent oxygen purity and high oxygen recovery exceeding 40 percent—in either the constant feed-product pressure type or variable feed-product pressure type of system as previously described. The fundamental aspects of this improved process are related to the five streams of FIG. 1 in a complete cycle: the compressed feed air stream 10 entering the zeolitic molecular sieve adsorption zone (illustrated as a block but comprising at least three separate adsorbent beds arranged in parallel flow relation), the oxygen effluent 11 discharged from the adsorption zone, the part 11a of oxygen effluent returned to the adsorption zone for purging, pressure equalization and repressurization, the unreturned part 11b of oxygen effluent released as product, and the waste gas 12 released at the adsorption zone inlet end with the nitrogen adsorbate.

As previously indicated, the compressed feed air 10 is introduced at ambient temperature and the highest superatmospheric pressure of 40–105 psia. This feed air pressure is the highest pressure during any part of the process sequence; the feed air pressure need not be constant as long as it is within the specified ranges and above the pressure in the receiving bed. The oxygen effluent 11 from the zone discharge end may emerge simultaneously with the introduction of feed air 10 (as in the constant feed-product pressure embodiment) or subsequently to the feed air introduction (as in the double ended feed air-oxygen repressurization embodiment). The oxygen effluent represents all of the gas emerging from the discharge end during one complete cycle of the process irrespective of whether it is discharged as product 11b or returned to the adsorption zone as 11a. Similarly, the oxygen return stream 11a is the sum of all streams returned to any adsorbent bed during all process steps of one complete cycle and for any purpose, i.e., as purge gas, pressure equalization gas or repressurization gas. It will also be apparent that all of the oxygen return stream 11a must be obtained from the oxygen effluent stream. The oxygen product 11b is the net difference between the oxygen effluent 11 and the oxygen return 11a and is further restricted to the portion or portions (since oxygen product can be formed from more than one process step) of the oxygen effluent at the highest available purity. By way of example, oxygen product would not be derived from oxygen effluent after nitrogen breakthrough from the bed discharge end.

It has also been stated that cocurrent depressurization of the adsorption zone should be terminated at pressure of 16–40 psia. with the feed air to cocurrent depressurization termination pressure ratio being at least 1.5. This termination pressure is the lowest level reached in any process step that is cocurrent with respect to the air feed, that is, oxygen effluent gas emerging from the discharge or product end of the the adsorption zone. On this basis, the oxygen effluent gas removed from the adsorption zone just prior to reaching the cocurrent depressurization pressure would include gas used for any purpose, e.g., product, pressure equalization with a bed other than the discharging bed and initially at lower pressure, or simply partial repressurization (but not to the extent of pressure equalization) of a different bed at lower pressure.

I have unexpectedly discovered that if a range of oxygen mass ratios for the oxygen effluent 11 and the oxygen return 11a are maintained relative to the oxygen mass of the feed air, the process performance is far superior to prior art adiabatic pressure swing processes for air separation in terms of both high oxygen product purity and recovery. These ratios are quite high, so that a large oxygen inventory is maintained in the adsorption zone which is released as effluent and returned to the zone during each complete cycle.

The large oxygen inventory associated with the adsorption zone is possible in the practice of this inventive process due to both adsorbent coadsorption effects (i.e., significant quantities of oxygen are adsorbed by zeolitic molecular sieves along with the nitrogen) and void space gas holdup (i.e., significant quantities of oxygen gas are held between the adsorbent particles). In particular, the required oxygen mass relationship is that for every unit of oxygen introduced in the feed air 10, between 5 and 13.5 units are removed in the oxygen effluent 11, and between 4 and 13.1 units are returned to the adsorption zone.

Figure 2:
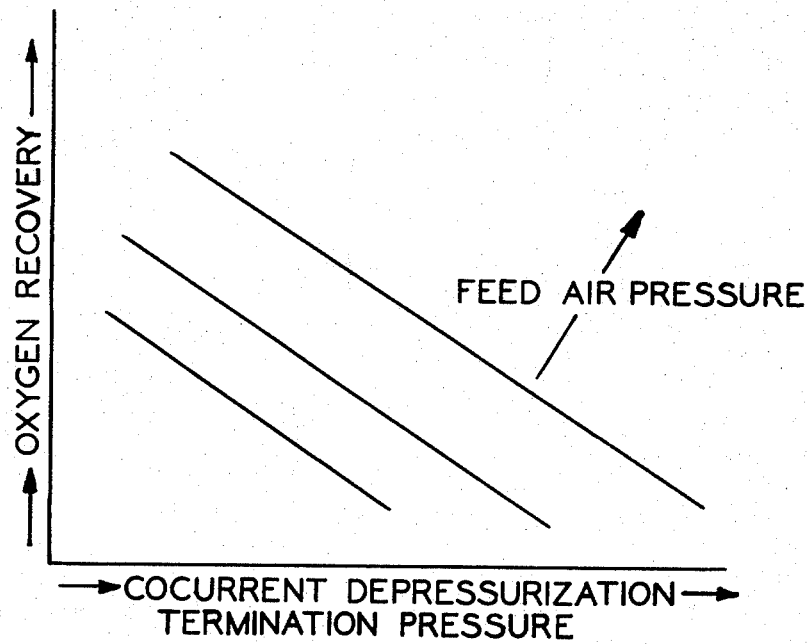
FIG. 2 is a graph illustrating the relationship between oxygen recovery, feed air supply pressure, and cocurrent depressurization termination pressure in air separation processes of this invention.

FIG. 2 illustrates the qualitative relationship between several important aspects of the invention, i.e., the variation of oxygen product recovery (11b in FIG. 1) as a function of feed air pressure and cocurrent depressurization termination pressure. The graph indicates that for a given feed air pressure, oxygen recovery will increase as cocurrent depressurization termination pressure is decreased. Similarly, for a fixed cocurrent depressurization termination pressure, oxygen recovery increases with increasing air feed pressure. Although the illustration of FIG. 2 shows the qualitative relationship of oxygen recovery with feed air and cocurrent depressurization pressures, it is not sufficient to insure the high performance characteristic of this invention. That is, the illustrated relationships only deal with oxygen recovery in a relative sense and not in an absolute sense. However, when the additional restraint of the proper oxygen mass relationship is introduced, then high performance (good oxygen product purity and recovery) of the adiabatic pressure swing process may be attained. Stated otherwise, to obtain high performance from a process provided with feed air at 40–105 psia. and having a cocurrent depressurization termination pressure of 16–40 psia. with the feed air to cocurrent depressurization termination pressure ratio being at least 1.5, there must be a high oxygen inventory which can be cycled during the process sequence such that the oxygen mass relationship of feed gas oxygen : oxygen gas from the first bed discharge : oxygen return gas is 1:5 – 13.5:4 – 13.1. If the process is operated at low oxygen inventory such that the oxygen gas discharged from the first bed is less than five times the mass of the oxygen in the air feed, or the oxygen return gas is less than four times the mass of such oxygen in the air feed, the performance will be significantly poorer. This is illustrated by the following comparison based on feed air at 45 psia. and cocurrent depressurization termination pressure of 18 psia. using three calcium zeolite A beds in the manner of FIGS. 6 and 8.

Oxygen Mass Relationship to Feed Gas Oxygen

| Oxygen Gas From First Bed Discharge End | Oxygen Return Gas | Oxygen Recovery(%) | Oxygen Product Purity(%) |
|---|---|---|---|
| 12.83 | 12.41 | 42 | 95 |
| 3.0 | 2.7 | 30 | 95 |

These examples show that by practicing this invention with high oxygen inventory in the selective adsorption zone such that the aforedefined oxygen mass relationship of feed gas oxygen : oxygen gas from the first bed discharge end : oxygen return gas is 1:12.83 : 12.41, 42 percent of the oxygen introduced in the feed gas may be recovered as product of 95 percent purity. In marked contrast, when the same system is operated at low oxygen inventory characteristic of the prior art and such that the oxygen mass relationship is 1:3.0 : 2.7, only 30 percent of the oxygen in the feed gas is recovered as product of 95 percent purity.

In the practice of this invention, the upper limits for the oxygen mass relationship of oxygen gas from the first bed discharge end and oxygen return gas of 13.5 and 13.1 respectively are needed to insure that the adsorbent beds are utilized to the maximum extent for the removal of oxygen from selective feed air. If the purge gas mass is excessive the nitrogen adsorption front is moved outside the inlet end and product purity oxygen gas is wasted. The feed air is provided in the range of 40–105 psia. and preferably in the range of 40–70 psia. to provide necessary adsorption-desorption pressure differential to maintain the desired high oxygen inventory in the adsorption zone. The cocurrent depressurization step is terminated at 16–40 psia. and preferably at 16–32 psia. with the feed air to cocurrent depressurization termination pressure ratio being at least 1.5, to achieve high nitrogen enrichment in the adsorption zone for efficient rejection during the succeeding countercurrent depressurization and thereby obtain high recovery of oxygen product.

Figure 3:
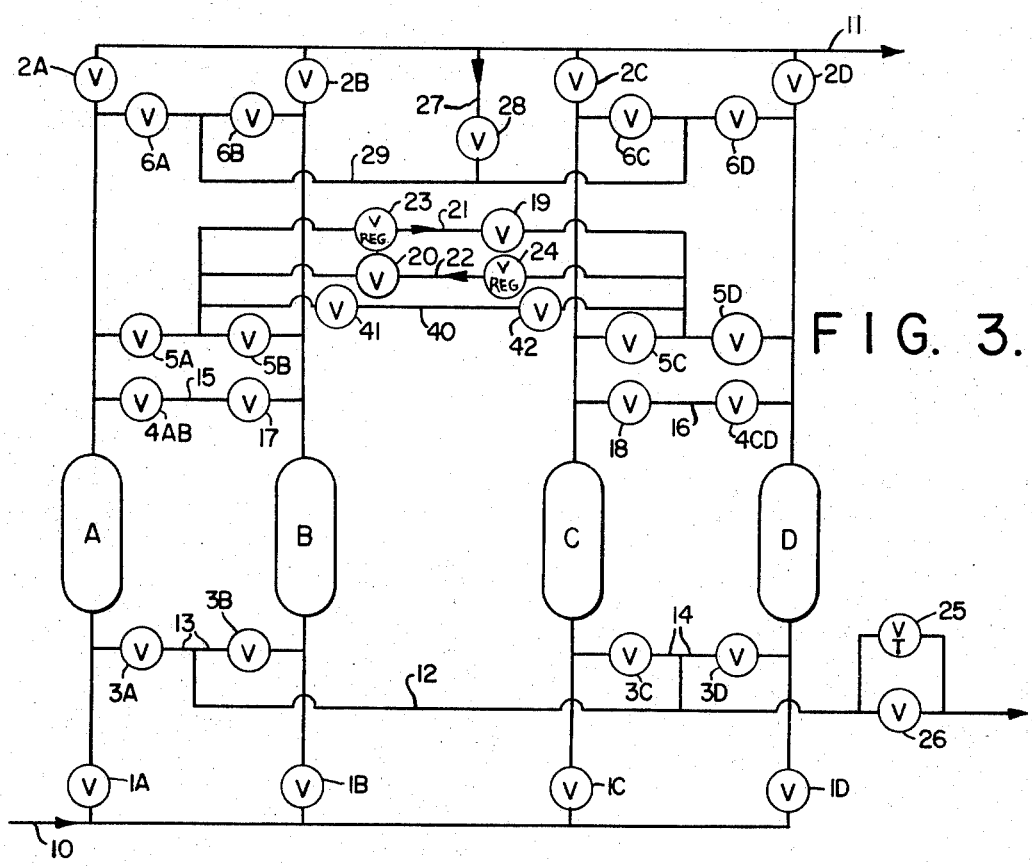
FIG. 3 is a schematic flowsheet of apparatus suitable for practicing the inventive process using feed air supplied to each of four adsorption zones in parallel flow sequence to produce oxygen at substantially the feed pressure.

Referring now to the drawings FIG. 3 shows four adsorbent beds A, B, C and D connected in parallel flow relation between feed air manifold 10 and unadsorbed oxygen effluent gas manifold 11. Automatic valves 1A, 1B, 1C and 1D direct feed air flow respectively to first bed A, second bed B, third bed C and fourth bed D. Automatic valves 2A, 2B, 2C and 2D respectively direct oxygen gas from the same beds into oxygen manifold 11.

The adsorbed nitrogen is rejected by countercurrent depressurization and purge through waste manifold 12 at the inlet end of the beds. Absorbers A and B are joined at their inlet ends to waste manifold 12 by conduit 13 having automatic valves 3A and 3B therein. Similarly adsorbers C and D are joined to waste manifold 12 at their inlet ends by conduit 14 having automatic valves 3C and 3D therein.

First stage equalization conduit 15 is provided joining the discharge ends of absorbers A and B; similarly first stage equalization conduit 16 is provided joining the discharge ends of adsorbers C and D. To provide first stage pressure equalization, automatic valves 4AB and 4CD are located in conduits 15 and 16 respectively. Valves 17 and 18 in series with equalization valves 4AB and 4CD respectively are manual preset throttling devices which prevent excessively high flow rates from occurring and which allow adjustment and balancing of equalization rates between the adsorption bed pairs AB and CD.

Automatic valves 5A, 5B, 5C and 5D are provided at the discharge ends of the beds, two of which open together to pass cocurrent depressurization gas from one adsorbent bed for use as purge gas in another bed. Manual valves 19 and 20 in the purge cross-over conduits 21 and 22 respectively serve the same purpose as explained previously for valves 17 and 18 in the first stage pressure equalization circuit. The purge cross-over conduits 21 and 22 (piped in parallel flow relation) also contain back pressure regulators 23 and 24 oriented in opposite flow directions so as to control flow in either direction between either bed A or B and bed C or D. The back pressure regulators 23 and 24 are set to maintain a minimum pressure, e.g., 65 psia., in the bed undergoing the part of the cocurrent depressurization step associated with purging another bed using the cocurrent depressurization oxygen. When this pressure is reached the associated cocurrent depressurization and purge step terminate. This arrangement prevents extension of cocurrent depressurization to excessively low pressure with resultant breakthrough of the nitrogen adsorption front.

As previously indicated, valves 17, 18, 19 and 20 are flow rate limiting devices which prevent bed damage due to excessive Δ P and fluid velocity. A similar precaution may be followed during countercurrent depressurization, by means of preset throttle valve 25 which acts as a bypass around main waste valve 26 in waste conduit 12. During countercurrent depressurization the automatic main waste valve 26 is closed which forces the gas to follow the bypass route through valve 25. During the following lowest pressure purge step, valve 26 opens to minimize flow resistance in the waste conduit 12.

Repressurization conduit 27 having constant flow control valve 28 therein joins oxygen manifold 11 for introduction of oxygen effluent from one adsorber (on the adsorption step) to a different adsorber having been partially repressurized to lower intermediate pressure. Conduit 27 in turn joins oxygen return conduit 29 communicating with repressurization valves 6A–6D joining the oxygen effluent conduits to adsorbers A-D respectively.

Second stage pressure equalization conduit 40 communicates at opposite ends with the bed A discharge end through valve 5A, bed B discharge end through valve 5B, bed C discharge end through valve 5C and bed D discharge end through 5D. Flow conduit 41 is controlled by valves 41 and 42.

It has been previously indicated that the adsorption step is terminated when the nitrogen adsorption front is entirely within the bed. This point may be determined in a manner well known to those skilled in the art, using the feed air conditions and the adsorbent's capacity and dynamic characteristics. Also the first pressure equalization step and at least part the cocurrent depressurization step (wherein the oxygen is used to purge another bed) are stopped when the adsorption front is still entirely within the bed and before breakthrough. This permits removal of the adsorbable nitrogen from the void space gas by the bed discharge end, so that the emerging oxygen gas has virtually the same purity as the oxygen gas discharged during the adsorption step. If the second lower pressure equalization part of the cocurrent depressurization step is conducted before the bed purging part, then all void gas recovery steps must be completed while the adsorption front is still entirely within the source bed. If the second lower pressure equalization part is carried out after the purging part of the cocurrent depressurization step (as illustrated in FIG. 4), the former may continue past the breakthrough point as the emerging gas is used for feed end repressurization. Breakthrough may for example be identified by monitoring the nitrogen concentration in the discharge gas, and detecting the moment at which this concentration appreciably increases. The purge step is most efficiently performed by removing only the nitrogen adsorbate deposited in the preceding step. That is, the bed is not completely cleaned of all nitrogen adsorbate by the purge fluid, but the latter's countercurrent flow insures that the adsorption front is pushed back towards the inlet end. This insures a clean oxygen effluent during even the initial portion of the succeeding adsorption step.

The use of the FIG. 3 system to practice the four-bed embodiment will be more easily understood by reference to the FIG. 4 cycle and time program. There are six distinct steps each involving commencement and/or termination of flows. Streams flowing into and out of the four-bed system are indicated by vertical lines connecting the feed air manifold 10, the oxygen effluent manifold 11 and the nitrogen desorbate waste manifold 12. The feed air manifold 10 connects vertically with each of the four adsorption steps and the latter in turn join vertically with the oxygen manifold 11. The countercurrent depressurization and purge steps, during which the nitrogen adsorbate is discharged from the beds, are connected vertically with the nitrogen desorbate waste manifold 12. The repressurization steps which use a portion of the oxygen effluent are connected vertically with oxygen manifold 11. All gas flows associated with the four beds are identified on the figure.

For recovery of oxygen product at substantially the feed air pressure (ignoring adsorption bed pressure drop) at least four adsorbent beds are needed to match, timewise, those steps in which cocurrent depressurization streams become available with those steps which can utilize these streams. Otherwise large hold-up tanks would be required. It will be apparent from FIG. 2 that at any moment of time, one of the adsorbent beds is on its adsorption step delivering oxygen at substantially constant pressure to the oxygen effluent manifold 11. At the same moment the other three beds are being cocurrently depressurized, or first stage pressure equalized, cleaned of the adsorbed nitrogen and/or repressurized respectively for the succeeding adsorption step. One of the beds is always receiving product oxygen gas for repressurization so that the consumption of oxygen for this purpose is continuous rather than intermittent.

In this particular cycle and in terms of any single bed, adsorption accounts for one-fourth of the total cycle, first pressure equalization and cocurrent depressurization account for one-fourth, countercurrent depressurization and purge for about one-sixth, and repressurization for the remaining about one-third. The utilization within the system of the pressure equalization and cocurrent depressurization gas is indicated by horizontal flow lines. Each first (I) pressure equalization step is connected horizontally with a repressurization step in another bed having already been partially repressurized, and each second (II) pressure equalization part of the cocurrent depressurization step is connected horizontally with a repressurization step of a different bed having just been purged. Each cocurrent depressurization step is connected horizontally with a purge step in a different bed.

Each step in the cycle of bed A will now be outlined and related to those components of FIG. 3 which are involved in the cycle changes. Pressures illustrative are involved in the cycle changes. Pressures illustrative of such operation are included. A total cycle time of 240 seconds might be used, as indicated in FIG. 4.

Time 0–60: Bed A is on adsorption at 70 psia. Valves 1A and 2A are open and valves 3A, 4AB, 5A and 6A are closed.

Time 60–75: At the end of the adsorption step, valves 1A and 2A close and valve 4AB opens to commence first stage pressure equalization between beds A and second bed B. At this moment, all other valves associated with bed B are closed except valve 6B (valves 1B, 2B, 3B and 5B). Valve 17 limits the flow rate of equalization gas to avoid bed fluidization, the direction being countercurrent to feed air flow in bed B.

Time 75–105: When pressures in beds A and B have equalized at a higher intermediate level of about 47 psia, valve 4AB closes and valves 5A, 19 and 5C open, allowing oxygen purge gas to flow from bed A into third bed C countercurrent to feed air flow. At this moment, all other valves associated with bed C except valve 1C are closed (valves 2C, 3C, 4CD and 6C). Valve 23 throttles and limits the flow of oxygen purge gas so that bed C remains at the lowest superatmospheric pressure of the process and slightly above one atmosphere pressure—sufficient for the desired purge gas flow.

Time 105–120: At the end of the purge step for third bed C, first bed A will have depressurized to about 32½ psia. At this point, valve 1C closes so that the continued flow of oxygen from bed A into bed C is bottled up. The continued flow of oxygen cannot be carried by the purge cross-over (conduit 21, valves 23 and 19) because the regulator valve 23 is set to terminate the purge flow when the pressure in bed A has dropped to the predetermined lower limit for the withdrawal of oxygen purge gas (e.g., 32½ psia). Therefore, the continued gas flow for countercurrent repressurization of bed C is shunted through conduit 40 by opening valve 41 and closing valve 23. Valve 42 in series with valve 41 is preset to limit the flow rate of repressurization gas. The beds A and C equalize at a lower intermediate pressure of about 8 psia. and thus constitutes the terminal cocurrent depressurization pressure level of the process.

Time 120–135: First bed A is now countercurrently depressurized to only slightly above one atmosphere pressure as the lowest pressure of the process by closing valves 5A and 41 and opening valve 3A. Valve 26 in the waste conduit 12 also closes forcing the blowdown gas through flow restrictive device 25.

Time 135–165: Purge gas for the first bed A is obtained from the cocurrent depressurization of fourth bed D after its first higher pressure equalization step. Valves 5A, 20 and 5D open to permit this flow countercurrent to the previously flowing feed air. At this time, all valves associated with bed D other than valve 5D are closed. Valve 24 throttles and limits the flow of oxygen purge gas so that bed A remains at only slightly above one atmosphere. Valve 26 in the waste conduit 12 is also reopened so as to minimize flow resistance to the low pressure purge gas.

Time 165–180: Bed A is now cleaned and ready to be repressurized countercurrently with oxygen gas. The initial phase of repressurization is accomplished by continued introduction of void space gas from fourth bed D. Valves 3A and 20 close and valve 41 opens to permit flow of oxygen gas from bed D to bed A. This partial countercurrent repressurization of first bed A continues until it is pressure equalized with fourth bed D at lower intermediate pressure, e.g., about 23 psia. This is also the second or lower pressure equalization stage of the bed D cocurrent depressurization.

Time 180–195: The next phase of bed A repressurization is accomplished by higher pressure equalization with second bed B which has just completed its adsorption step and is initially at full feed pressure. Valves 5A and 29 close and valve 4AB opens to admit oxygen gas discharged cocurrently from bed B. Valve 17 limits the flow to prevent bed fluidization. This further countercurrent repressurization of first bed A continues until it is pressure equalized with second bed B at higher intermediate pressure, e.g., about 47 psia. This is the first or higher pressure equalization stage of bed B.

Time 195-240: The final phase of bed A repressurization to substantially feed air pressure is accomplished with oxygen gas discharged from third bed C through manifold 11, which gas is preliminarily flow regulated by device 28 into repressurization manifold 29. Valve 4AB is closed and 6A opened to admit the regulated oxygen gas into bed A. In preferred practice, this final phase of repressurization using oxygen effluent gas commences at minute 18 and proceeds simultaneously with the first higher pressure equalization step of bed B. Such overlapping of the two sources of repressurization gas is advantageous because it smooths the internal utilization of oxygen effluent and avoids fluctuations of oxygen product flow and pressure. When bed A reaches the pressure level of manifold 29, valve 6A is closed and the bed is again ready to receive feed air for separation.

The above described cycle for bed A is tYpical for beds B, C and D. As represented in FIG. 4, the time sequence for placing beds on-stream for adsorption is A, D, B and C, i.e., the first, fourth, second and third beds.

Summarizing the preferred embodiment with four adsorption beds of FIG. 4 wherein the feed air is introduced to the first bed at highest superatmospheric pressure of 40-105 psia. and oxygen is simultaneously discharged at substantially the same pressure. Then the first bed is first higher pressure equalized with a second bed. Next, the first bed is cocurrently depressurized with oxygen from the first bed discharge end being returned during the first part of such cocurrent depressurization to the discharge end of a countercurrently depressurized third bed as the purge gas for the desorption of nitrogen adsorbate. On completion of the third bed purging, the oxygen from the first bed cocurrent depressurization is returned to the purged third bed for partial repressurization thereof until the first and third beds are second lower pressure equalized. The first bed is next countercurrently depressurized, purged with oxygen gas from the discharge end of a cocurrent depressuring fourth bed, and partially repressurized with oxygen gas from the fourth bed as the second lower pressure equalization of such fourth bed. Now the first bed is further repressurized with oxygen gas from the second bed as the latter's first higher pressure equalization, after which the first bed is still further repressurized with feed air to the superatmospheric pressure. The aforedescribed steps are consecutively followed with the fourth, second and third beds in accordance with the flow cycle sequence of FIG. 4, the oxygen mass relationship of feed gas oxygen : oxygen gas from the first through the fourth bed discharge ends; oxygen return gas being 1 : 5 – 13.5 : 4 – 13.1.

EXAMPLE 1

A four bed system in accordance with FIG. 3 was used to separate air following the cycle sequence of FIG. 4. Each of the four beds consisted of two sections in series flow sequence, and contained a total of about 118 pounds of 1/16-inch diameter calcium zeolite A molecular sieve pellets in a combined packed section 6 inches inside diameter and 144 inches long for selective adsorption of nitrogen.

The compressed feed air was at 70 psia. and about 85°F., and was not pretreated for removal of minor impurities. Its $CO_2$ content was normal (about 300 ppm) and moisture content varied between 600 and 1,000 ppm with occasional peaks to 2,000 ppm.

The total cycle time was lengthened to 12 minutes (as compared with the 4 minutes of the FIG. 4 cycle) with 3 minutes for adsorption, 25 seconds for first higher pressure equalization, 2 minutes 10 seconds for the purge gas part of cocurrent depressurization and 25 seconds for the second lower pressure equalization part of cocurrent depressurization, 25 seconds for countercurrent depressurization or blowdown, 2 minutes 10 seconds for purge, and 3 minutes 25 seconds for repressurization. Table I summarizes the results of two runs conducted at different feed rates:

TABLE I

| | Test I | Test II |
|---|---|---|
| Feed Rate (at 1 atm., 60°F.) | 362 cfh. | 372 cfh. |
| Terminal Pressures | | |
| Equalization I | 47 psia. | 47 psia. |
| Cocurrent depressurization (purge gas part) | 32½ psia. | 33 psia. |
| Cocurrent depressurization (Equalization II part) | 23 psia. | 23½ psia. |
| Purge | 15 psia. | 15 psia. |
| Pressure Ratio Feed: Cocurrent depressurization terminal | 3.04 | 3.04 |
| Product Withdrawal rate (at 1 atm., 60°F.) | 31.4 cfh. | 38.0 cfh. |
| Composition | | |
| Argon | 4.0% | 3.92% |
| Nitrogen | 160 ppm. | 0.27% |
| Oxygen | 96.0% | 95.81% |
| Portion of Oxygen in feed recovered in product (percent) | 39.9% | 45.6% |
| Oxygen Mass Relationship Feed gas : effluent : return | 1:9:8.6 | 1:9:8.54 |

From this data and the known oxygen-nitrogen selectivity of sodium zeolite X (13X), it has been estimated that if this larger pored zeolitic molecular sieve were substituted for calcium zeolite A in the same process step sequence and conditions, the oxygen mass relationship of feed gas : effluent : return would be about 1:13:12.6 for a product purity of 96 percent at an oxygen recovery of 40 percent.

Other adsorption systems for air separation which do not separate and recover the void space gas have been alleged to achieve recovery equivalent to that of Example I but only at low purity, e.g., 30-40 percent oxygen. Higher purities have been reported by the prior art, e.g., 85 percent oxygen product, but the reported recovery is only about 1 percent of the feed.

Although the aforedescribed two step pressure equalization cycle of FIG. 4 is preferred when four adsorbent beds are used and the oxygen product is needed at substantially the feed air pressure, other cycles may be used in the practice of this invention as for example the four bed cycle of FIG. 5. Apparatus suitable for practicing the FIG. 5 cycle and time program is similar to FIG. 4 but conduits 15, 18, 22 and 40 are not required and valves 19 and 23 in conduit 21 are deleted. Comparison of FIGS. 4 and 5 reveals that in the latter the cocurrent depressurization step comprises two parts in which the depressurizing bed is consecutively first higher pressure equalized and second lower pressure equalized with different beds. Also, following the first lower pressure part of repressurization with oxygen gas (by the second lower pressure equalization), the partially repressurized bed is isolated (all valves closed in conduits associated with the bed) for a period before repressurization is resumed (by the first higher pressure equalization). With valves 19 and 23 removed, the cocurrent depressurization - first and second pressure equalization flows are through conduit 21 joining the bed discharge ends. Valves 5A, 5B, 5C and 5D provide the necessary flow controls. Oxygen gas is returned to the discharge end of the beds for both final repressurization and purge through conduit 29. Valves 6A, 6B, 6C and 6D are used to open conduit 29 to beds A, B, C and D respectively. Conduit 29 is connected to oxygen manifold 11 by conduit 27. The gas flow through conduit 27 is regulated by control valve 28 which determines the oxygen flow returned to the discharge end of the beds.

Each step in the FIG. 5 cycle of bed A will now be outlined and related to those components of FIG. 3 which are involved in the cycle changes. Pressures illustrative of such operation using calcium zeolite A adsorbent are included.

Time 0–60: Bed A is receiving feed air at 55 psia. as its adsorption step. Valves 1A and 2A are open and valves 3A, 5A, 6A are closed.

Time 60–90: At the end of the bed A adsorption step, valves 1A and 2A close and valve 5A opens to commence the cocurrent depressurization and first higher pressure equalization between beds A and C. At this time, all other valves associated with bed C are closed except valve 5C.

Time 90–105: When the pressure level in beds A and C has equalized at about 42 psia., the cocurrent depressurization of bed A is further continued by second lower pressure equalizing bed A with previously purged bed D. Valve 5C (associated with bed C) is closed, valve 5A (associated with bed A) remains open, and valve 5D (associated with bed D) is opened. All other valves associated with bed D (valves 1D, 3D, 2D, 6D) are closed during this step. At the end of this step, the pressure level in beds A and D are equalized at about 28 psia.

Time 105–120: At the end of the second lower pressure equalization, bed A is countercurrently depressurized through the inlet end to only slightly above atmospheric pressure. Valve 5A is closed and valve 3A opens to direct waste gas to the waste manifold 12. During this step, all other valves associated with bed A (valves 1A, 5A, 2A, 6A) are closed.

Time 120–150: After bed A is countercurrently depressurized to about atmospheric pressure, it is purged by returning part of the oxygen gas obtained from bed C into the discharge end of bed A and flowing nitrogen desorbate-containing purge gas from the inlet end of bed A into the waste manifold 12. Valves 6A and 3A are open and valves 1A, 5A, 2A are closed. Valves 6B, 6C, 6D in oxygen return conduit 29 are closed during this step.

Time 150–165: After bed A has been purged, it is partly countercurrently repressurized to 28 psia. by being second lower pressure equalized with bed B. Oxygen gas discharged from bed B flows through valve 5B and 5A into the discharge end of bed A. Other valves associated with bed A (1A, 3A, 2A, 6A) are closed.

Time 165–180: Bed A is isolated during this time period. All valves (1A, 3A, 2A, 5A, 6A) are closed.

Time 180–210: Bed A is further countercurrently repressurized from 28 to 42 psia. by first higher pressure equalization with bed C. Discharge gas from bed C flows through valve 5C, conduit 21, and valve 5A. All other valves associated with bed A (1A, 3A, 2A, 6A) are closed.

Time 210–240: Bed A is still further repressurized from 28 psia. to the feed air pressure of 55 psia. by part of the oxygen gas returned from bed D. This final repressurization oxygen gas is supplied through conduit 27 and 29 and regulated by flow controller 28. The gas enters the discharge end of bed A through open valve 6A. Other valves associated with bed A (1A, 3A, 2A, 5A) are closed.

Summarizing the FIG. 5 embodiment following the feed air introduction at the highest superatmospheric pressure and oxygen discharge at substantially the same pressure, the first bed is cocurrently depressurized with oxygen from the first bed discharge being returned during the first part of such cocurrent depressurization to the discharge end of a partially repressurized third bed for further repressurization thereof until the first and third beds are first higher pressure equalized. For the second part of the first bed cocurrent depressurization, the discharged oxygen is returned to the discharge end of the purged fourth bed for partial repressurization thereof until the first and fourth beds are second lower pressure equalized. The first bed is then countercurrently depressurized and thereafter purged with oxygen gas from the discharge end of the third bed while same is receiving feed air.

The purged first bed is partially repressurized with oxygen gas from the cocurrently depressurizing second bed until the first and second beds are second lower pressure equalized. The partially repressurized first bed is isolated for a period and thereafter further repressurized with oxygen gas from the cocurrently depressurizing third bed until the beds are first higher pressure equalized. The first bed is still further repressurized with oxygen gas from the discharge end of the fourth bed while same is receiving feed gas, and the aforedescribed steps are consecutively followed with the second, third and fourth beds in accordance with the flow cycle sequence of FIG. 5.

Figure 6:
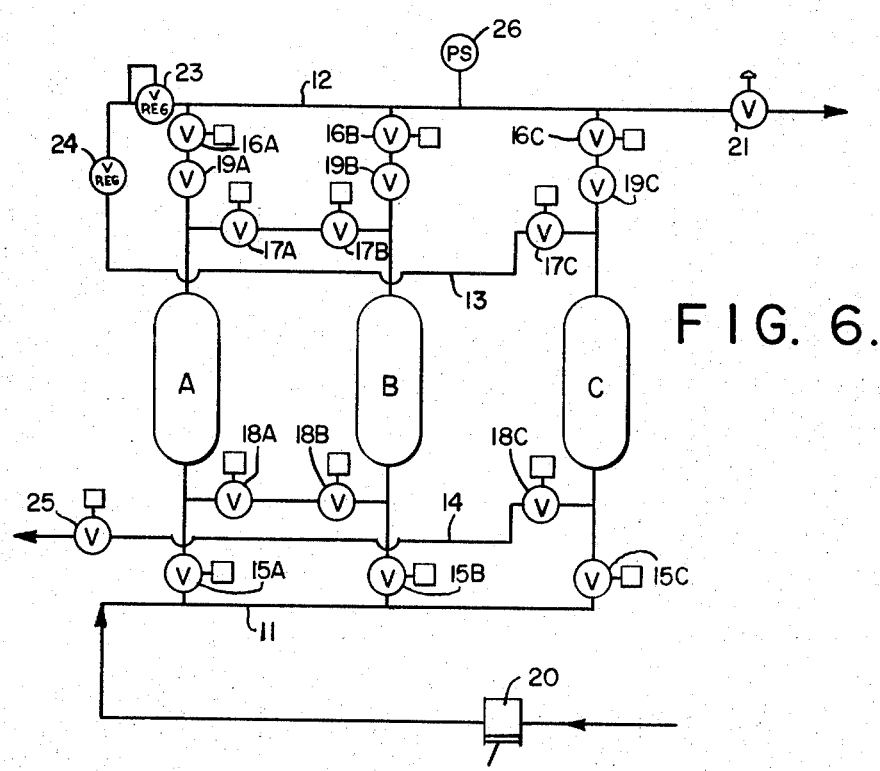
FIG. 6 is a schematic flowsheet of apparatus suitable for practicing the inventive process using feed air supplied to each of three adsorption zones in parallel flow sequence to produce oxygen at substantially lower pressure than the feed air.
Figure 7:
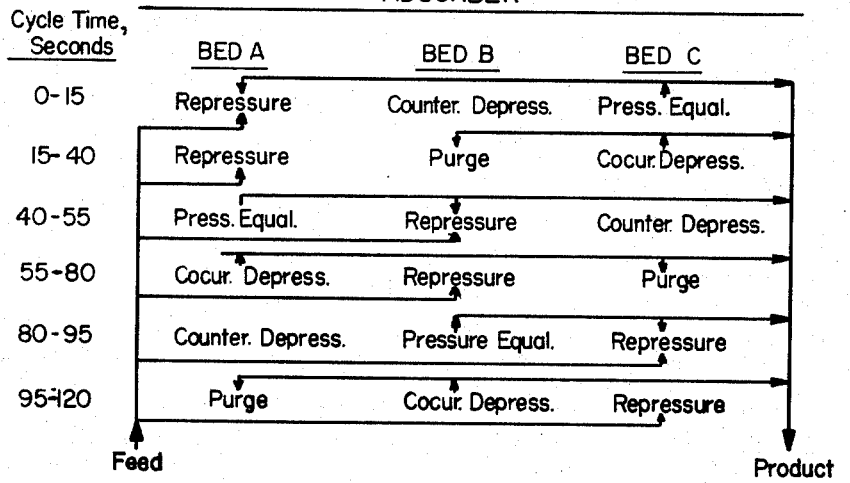
FIG. 7 is a cycle and time program for various steps of a low pressure oxygen product embodiment of this process which can be practiced with the FIG. 6 apparatus.
Figure 8:
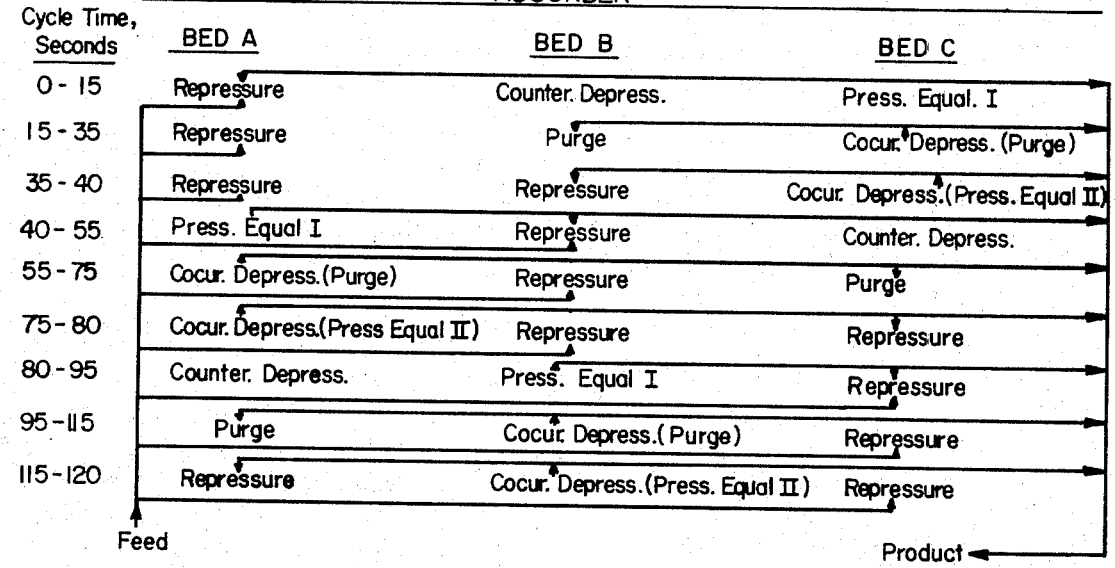
FIG. 8 is a preferred cycle and time program for practice with the FIG. 6 apparatus having first higher and second lower pressure equalizations.

The FIGS. 3–5 embodiments are particularly attractive where the oxygen product is needed at substantial pressure, i.e., relatively high pressure approximating that of the compressed feed air, but FIGS. 6–8 illustrate three adsorbent bed embodiments which may be preferred when the oxygen product is to be consumed at only slightly above atmospheric pressure, e.g., as the aeration gas for an activated sludge waste treatment system. In the latter embodiments, at least the major part of the feed air is introduced attendant a rise in adsorbent bed pressure. The bed pressure rises because the net instantaneous rate of gas introduction (inflow minus outflow) exceeds the adsorption capability of the bed. These embodiments are distinct from those wherein at least the major part of the feed air is introduced during a steady pressure adsorption step, i.e., wherein the net rate of feed air introduction equals the adsorption capability of the bed.

Referring now to FIG. 6, it shows three adsorbent beds A, B, and C connected in parallel flow relation between feed air manifold 11, oxygen effluent gas manifold 12, oxygen purge manifold 13 and waste manifold 14. Automatic valves 15A, 15B and 15C direct feed air flow respectively to first bed A, second bed B, and third bed C. Automatic valves 16A, 16B, and 16C respectively direct effluent oxygen gas from the same beds into manifold 12. Purge manifold 13 joins one oxygen effluent gas manifold 12 at the discharge end of the three beds, and oxygen purge gas is introduced through automatic valves 17A, 17B, and 17C to beds A, B, and C countercurrent to the direction of feed air flow. Automatic valves 18A, 18B, and 18C join waste manifold 14 at the inlet end of the corresponding beds for discharge of countercurrent depressurization gas and purge gas. Valves 19A, 19B, and 19C at the discharge end upstream of oxygen effluent valves 16A, 16B, and 16C respectively are the manual trim type for limiting the flow of pressure equalization gas.

FIG. 7 illustrates one timing sequence suitable for use with the FIG. 6 system, employing six distinct steps each involving commencement and/or termination of flows. Streams flowing into and out of the three bed system are indicated by vertical line flows in the feed manifold 11 and in the oxygen effluent gas manifold 12. The feed air manifold 11 connects horizontally with each of the three adsorbent beds and the latter in turn join horizontally with the oxygen effluent manifold 12. The repressurization and purge steps which use a portion of the oxygen effluent are connected horizontally with the steps, e.g., cocurrent depressurization and pressure equalization which supply the returned oxygen gas. All inter-bed flows are identified on the figure.

It will be apparent from FIG. 7 that at any moment of time one of the adsorbent beds is delivering oxygen at progressively diminishing pressure to the manifold 12 as follows: bed C during 0-40 seconds, bed A during 40-50 seconds, bed A during 50-80 seconds, and bed B during 80-120 seconds. Accordingly, product oxygen flow to the consuming means is continuous.

In this particular cycle and in terms of any single bed, repressurization accounts for one-third of the total cycle, oxygen effluent flow and simultaneous pressure equalization or cocurrent depressurization account for one-third, and countercurrent depressurization and purge for the remaining one-third. The utilization within the system of part of the oxygen effluent from a particular bed as the pressure equalization and cocurrent depressurization gas is indicated by horizontal flow lines. Each pressure equalization step is connected horizontally with a repressurization step in another bed having already been purged, and each cocurrent depressurization step is connected horizontally with a purge step of a different bed having just been countercurrently depressurized.

Each step in the cycle of bed A will now be outlined and related to those components of FIG. 6 which trative of such operation for air separation using calcium zeolite A adsorbent are included.

Time 0-15: Bed A is being repressurized, bed B countercurrently depressurized, and bed C pressure equalized. Valves 15A and 16A are open and valves 17A and 18A are closed. Feed air is introduced to bed A at its inlet end from manifold 11 and oxygen effluent gas from manifold 12 is simultaneously introduced at the bed A discharge end. The latter is derived from bed C through trim valve 19C, valve 16C, and flows consecutively through valves 16A and trim valve 19A into bed A. Bed C is cocurrently depressurized during this period and the flow continues until pressures between beds A and C are substantially equalized at about 34 psia. During this period, the flow of equalization gas is rapid while the flow of feed air from compressor 20 is limited, so that the major portion of the gas for repressurizing bed A from 15 to 34 psia. is effluent oxygen, e.g., 72 percent for air separation. During this period, another part of the oxygen gas released from bed C is discharged as product in manifold 12.

Time 15-40: Valve 16A is now closed and only the flow of feed air continues to bed A until the terminal pressure of 55 psia. is reached. This completes the repressurization period for bed A. During the repressurizations, a nitrogen adsorption front is established near the inlet end of bed A and moves progressively toward the discharge end. The feed air quantity relative to the oxygen gas used for repressurization is such that when the repressurization is completed, there remains a predetermined length of unloaded bed between the nitrogen adsorption front and the discharge end.

Time 40-55: The pressure equalization step for bed A commences by closing valve 15A and opening valves 16A and 16B cocurrently depressurizing the bed by releasing gas from the discharge end. This gas flows through the unloaded bed length wherein the nitrogen component is adsorbed and the emerging oxygen effluent gas is employed in two parts. Oxygen product gas flows through control valve 21 in manifold 12 to the consumer conduit downstream valve 21 at a rate serving to hold the consumer conduit at a suitable low pressure such as 3 psia. The remainder and major part of the oxygen gas flows through valves 16B and 19B to the discharge end of bed B for partial repressurization thereof. Bed B has previously been purged of nitrogen adsorbate and is initially at the lowest pressure level of the system, about 15 psia. This flow of oxygen effluent gas from bed A to bed B continues for about 15 seconds until the two beds are at substantially the same pressure as for example 34 psia.

Time 55-80: Additional oxygen effluent gas is released from the bed A discharge end for further cocurrent depressurization thereof, with one part introduced to the bed C discharge end by closing opening valve 16B and automatic valve 17C in the purge manifold for purging nitrogen adsorbate at about 15 psia. Valves 23 and 24 reduce the purge gas pressure to slightly above one atm., and also hold the flow rate of purge gas constant. This in turn holds the total quantity of purge gas constant since the purge step is preferably a fixed length of time. The flow rate is controlled at a steady value by regulating valve 23 which holds the pressure constant between the two valves 23 and 24. The waste gas emerging from the bed C inlet end flows through automatic valve 18C in waste manifold 14 and is released through automatic waste discharge valve 25. The last mentioned valve is a flow-limiting device rather than the shut-off type. When "closed" it introduces a flow restriction into the waste manifold 14 which reduces the depressurization rate to a value below that causing attrition of the adsorbent particles. However, for the discharge of purge gas, valve 25 is open to remove the restriction inasmuch as flow is already limited by valve system 23, 24. Another part of the oxygen effluent gas from bed A is discharged as oxygen product. During this step the pressure of bed A and manifold 12 continues to decrease until it reaches about 21.5 psia., which occurs after an additional 25 seconds (80 seconds into cycle or two-thirds of the total cycle). The lowest pressure limit for cocurrent depressurization, e.g., 21.5 psia., should be maintained because the pressure corresponds to imminent breakthrough of the adsorption front at the discharge end of the bed. This completes the production phase for bed A. For this particular illustration, the feed air to cocurrent depressurization termination pressure ratio is about 55/21.5 = 2.56.

Time 80–95: Bed A now begins its nitrogen adsorbate rejection (desorption) phase by closing valves 16A and 17C, and opening valve 18A. Additional gas at 21.5 psia. is released from the bed A inlet end for countercurrent depressurization thereof through waste manifold 14 and discharge valve 25. The latter valve is "closed" for this step in order to introduce the aforesaid restriction and avoid excessive flow rates from the bed. This step continues to slightly above one atmosphere in about 15 seconds.

Time 95–120: Bed A is purged of remaining nitrogen adsorbate by opening valves 17A and 25. Additional oxygen effluent gas from the discharge end of bed B flows through manifold 12 through valves 23, 24 and purge manifold 13, then through valve 17A to the bed A discharge end. The nitrogen-containing purge gas emerging through the bed A inlet end flows through valve 18A and is discharged through waste valve 25. Purging continues for 25 seconds at which time the full 120 second cycle is completed. Bed A is now ready for repressurization in the previously described manner.

Beds B and C are consecutively cycled through the aforediscussed steps with bed B entering the simultaneous feed air-oxygen effluent gas repressurization with the bed A pressure equalization step (time 40–55 seconds). Bed C enters the simultaneous feed air-oxygen effluent repressurization with the bed A countercurrent depressurizations step (time 80–95 seconds). The necessary valve changing for these steps will be recognized from FIGS. 6–7 and the foregoing description. A cycle control system is necessary to initiate and coordinate these valve changes. The cycle controller may for example receive a signal from pressure sensing means in feed air conduit 11 downstream compressor 20.

It should be understood that modifications of the FIG. 7 time program are contemplated. For example, the duration of the purge step need not exactly coincide with the cocurrent depressurization step of the bed providing the purge gas. The purge step of bed A may be terminated slightly before the cocurrent depressurization step of bed B is completed and purged bed A may be isolated during this short period before repressurization of same is started. Accordingly, all of the cocurrent depressurization gas from bed B is delivered as product oxygen during the bed A isolation and none is used internally.

FIG. 8 illustrates a preferred embodiment of the three-bed system which can be practiced with the FIG. 6 apparatus. The FIG. 7 time schedule has been modified to provide two pressure equalization steps during depressurization of each bed rather than one, with the second lower pressure equalization comprising part of the cocurrent depressurization step of the bed releasing oxygen effluent. This permits higher product recovery while retaining the same product purity. A step-by-step comparison of FIG. 8 with FIG. 6 (for example bed A) shows that the simultaneous feed air—oxygen effluent gas repressurization is of the same duration (0–15 seconds). Also, the total duration of the feed air further repressurization to the highest superatmospheric pressure of the process is the same (15–35 and 35–40 seconds). The first stage pressure equalization in FIG. 8 is similar to the single pressure equalization of FIG. 7 (40–55 seconds) except that it continues to 38 psia. rather than to 34 psia.

During the second stage pressure equalization part of the cocurrent depressurization (75–80 seconds), more oxygen effluent gas is released from the bed A discharge end and directed into the bed C discharge end. Valve 18C is closed so that bed C is partially repressurized. This flow continues until the gas pressures in beds A and C are substantially equal. This occurs after about 5 seconds and at 20 psia.

The countercurrent depressurization steps of FIGS. 7 and 8 are of the same duration (80–95 seconds), but the FIG. 8 purge step is 5 seconds shorter (95–115 seconds instead of 95–120 seconds). In the final five seconds of the process, the purged bed is partially repressurized by flow of oxygen effluent gas from the discharge end of bed B into the first bed discharge end until the two beds are pressure equalized to about 20 psia., i.e., the second stage pressure equalization of bed B.

Summarizing the aforedescribed three adsorption bed embodiment which is preferred when oxygen gas product is to be discharged at low pressure, the first bed is initially at the lowest superatmospheric pressure and purged of nitrogen adsorbate. Feed air and oxygen gas are simultaneously introduced respectively to the first bed inlet end and discharge end initially at the highest superatmospheric pressure of 40–70 psia. Oxygen gas is simultaneously released from the discharge end of a third bed initially at the highest superatmospheric pressure with one part discharged as product and the balance returned to the first bed discharge end for such simultaneous introduction, the gas flows continuing until the first and third beds are first higher pressure equalized. After terminating the oxygen gas introduction to the discharge end, the feed air introduction to the first bed inlet end is continued until the bed is repressurized to the highest superatmospheric pressure. Oxygen is thereafter released from the repressurized first bed discharge end with one part thereof discharged as product and the balance returned to the discharge end of a partially repressurized second bed for simultaneous introduction during feed air introduction to the second bed inlet end until the first and second beds are first higher pressure equalized. The first bed is then cocurrently depressurized to 16-32 psia. with one part of the oxygen discharged as product and the balance returned to the third bed discharge end during the first part of such cocurrent depressurization for purging of nitrogen adsorbate therefrom. On completion of the third bed purging, the balance of the first bed oxygen is returned to the third bed discharge end until the first and third beds are second lower pressure equalized. The first bed is thereafter countercurrently depressurized and oxygen from a cocurrent depressurizing second bed is then returned to the first bed discharge end for purging thereof. The aforedescribed steps are consecutively followed with the second and third beds in accordance with the flow cycle sequence of FIG. 8, the oxygen mass relationship of feed gas oxygen : oxygen gas from the first through third bed discharge ends : oxygen return gas being 1 : 5 – 9.5 : 4 –9.1.

The advantages of the invention were illustrated in a series of tests employing the three bed embodiment of FIG. 6 with the time program of FIGS. 7 and 8.

EXAMPLE 2

Each of the three adsorbent beds was 26 inches inside diameter and 96 inches long, containing 1,300 pounds of 1/16 inch diameter calcium zeolite A pellets. Air was compressed to 55 psia. and fed to the system at an average rate of 6,100 cu. ft./hr. S.T.P. without pretreatment, i.e. without drying or $CO_2$ removal. Referring to FIG. 7, each bed was repressurized by simultaneous introduction of compressed air and oxygen effluent gas to an equalization pressure of about 34 psia. (35 psia. source bed and 33 psia receiving bed). The final repressurization with compressed air was continued to the full 55 psia level. In the next step, the finally repressurized bed was equalized with simultaneous delivery of product oxygen to about 34 psia. Next, the bed was further cocurrently depressurized to about 21.5 psia. while simultaneously providing purge gas for another bed and product for consumption. The bed was then countercurrently depressurized to about 16 psia. and countercurrently purged at the same pressure level. Oxygen product was delivered at a rate of 745 cu.ft./hr. S.T.P. at a pressure of 20 psia. and a purity of 90.9 percent oxygen. The oxygen product recovery was 53 percent of the oxygen introduced in the feed gas. This recovery is substantially higher than that attainable using the four bed system of Wagner U.S. Pat. No. 3,430,418 and the plant investment for adsorbent beds and related piping is reduced by about one-fourth. In this example, the feed air to cocurrent depressurization termination pressure ratio was about 55/20 = 2.74, and the oxygen mass relationship of feed gas oxygen : oxygen gas from the discharge end of the three beds : oxygen return gas was about 1 : 5 : 4.47.

EXAMPLE 3

The same system was used as in Example 2, but pressure equalization was accomplished in the two-step manner of FIG. 8. Compressed air at 55 psia. was fed to the system at an average rate of 6,458 cu.ft./hr. S.T.P. without pretreatment. Each bed was first repressurized by equalization with a second bed to a lower pressure of about 20 psia., next by equalization with a third bed while simultaneously introducing feed air to a higher pressure of about 38 psia., and finally by compressed air only to the 55 psia. level. The bed was then first pressure equalized with a second bed at about 38 psia. while simultaneously discharging oxygen product. Next, it was cocurrently depressurized to provide purge gas for a third bed and also continued to discharge product oxygen until the first bed pressure dropped to 25.5 psia. In the ensuing second pressure equalization part of the cocurrent depressurization step with a third bed and simultaneous product oxygen discharging, the terminal pressure was 20 psia. The bed was then countercurrently depressurized to a purge pressure of about 15.5 psia., followed by purging with oxygen effluent from the second bed. Oxygen product was delivered at a rate of 750 cu.ft./hr. S.T.P. at 20 psia. and a purity of 90 percent oxygen. The oxygen product recovery was 55.5 percent of the oxygen introduced. This recovery is comparable with that attainable using the four bed-two step pressure equalization system of FIGS. 3 and 4. The feed air to cocurrent depressruization termination pressure ratio was again about 2.74 and the oxygen mass relationship of feed gas oxygen : oxygen gas from the discharge end of the three beds : oxygen return gas was about 1 : 5 : 4.44.

Although certain embodiments have been described in detail, it will be appreciated that other embodiments are contemplated along with modifications of the disclosed features, as being within the scope of the invention.

What is claimed is:

1. In an adiabatic pressure swing process for air separation by selectively adsorbing nitrogen alternately in at least three zeolitic molecular sieve adsorption beds at ambient temperature by introducing feed air to the inlet end of a first adsorption bed at highest superatmospheric pressure, discharging oxygen from the discharge end and introducing at least part of the oxygen to a purged bed for partial repressurization thereof, releasing additional oxygen from the first bed discharge end thereby cocurrently depressurizing said first bed and terminating such cocurrent depressurization when the first bed is at lower superatmospheric pressure, discharging one part of said oxygen from the first bed as product and returning the balance of said oxygen for repressurization and purging of other adsorption beds, releasing waste gas from the first bed inlet end thereby countercurrently depressurizing same, introducing oxygen gas from another adsorption bed discharge end to the first bed discharge end as purge gas and flowing same therethrough at a lowest superatmospheric pressure for desorption of the nitrogen adsorbate and discharging the nitrogen adsorbate-containing purge gas from the first bed inlet end as waste gas, introducing oxygen gas from the discharge end of an other-than-first adsorption bed and at above said lowest superatmospheric pressure to the purged first bed for at least partial repressurization thereof before reintroduction of said feed air to the inlet end, the improvement characterized by introducing said feed air to said first bed at highest superatmospheric pressure of 40–105 psia., and terminating said cocurrent depressurization at lower superatmospheric pressure of 16-40 psia. with the feed air to cocurrent depressurization termination pressure ratio being at least 1.5, and maintaining an oxygen mass relationship of feed gas oxygen : oxygen gas from the first bed discharge end : oxygen return gas of 1:5 – 13.5 : 4 – 13.1.

2. An adiabatic pressure swing process according to claim 1 wherein said feed air is introduced to said first bed at highest superatmospheric pressure of 40-70 psia., said cocurrent depressurization is terminated at lower superatmospheric pressure of 16-32 psia. and the oxygen mass relationship of feed gas oxygen : oxygen gas from the first bed discharge end : oxygen return gas is 1:5 – 9.5 : 4 – 9.1.

3. An adiabatic pressure swing process according to claim 1 with four adsorption beds wherein said feed air is introduced to said first bed at highest superatmospheric pressure and oxygen is simultaneously discharged at substantially the same pressure, the first bed is first higher pressure equalized with said second bed, cocurrently depressurized with oxygen from the first bed discharge end being returned during the first part of such cocurrent depressurization to the discharge end of a countercurrently depressurized third bed as purge gas for the desorption of nitrogen adsorbate and such oxygen thereafter being returned to the purged third bed for partial repressurization thereof until the first and third beds are second lower pressure equalized, countercurrently depressurized, purged with oxygen gas from the discharge end of a cocurrently depressurizing fourth bed, partially repressurized with oxygen gas from said fourth bed as the second lower pressure equalization thereof, further repressurized with oxygen gas from said second bed as the first higher pressure equalization thereof, and thereafter still further repressurized with feed air to said highest superatmospheric pressure, and the aforedescribed steps are consecutively followed with the fourth, second and third beds in accordance with the flow cycle sequence of FIG. 4.

4. An adiabatic pressure swing process according to claim 1 with four beds wherein said feed air is introduced to said first bed at highest superatmospheric pressure and oxygen is simultaneously discharged at substantially the same pressure, the first bed is cocurrently depressurized with oxygen from the first bed discharge being returned during the first part of such cocurrent depressurization to the discharge end of a partially repressurized third bed for further repressurization thereof until the first and third beds are first higher pressure equalized and thereafter said oxygen being returned during the second part of such cocurrent depressurization to the discharge end of a purged fourth bed for partial repressurization thereof until the first and fourth beds are second lower pressure equalized, countercurrently depressurized, purged with oxygen gas from the discharge end of said third bed while same is receiving feed air, partially repressurized with oxygen gas from a cocurrently depressurizing second bed until the first and second beds are second lower pressure equalized, the partially repressurized first bed is isolated for a period and thereafter further repressurized with oxygen gas from the cocurrently depressurizing third bed until the first and third beds are first higher pressure equalized, the first bed is still further repressurized to said highest superatmospheric pressure with oxygen gas from the discharge end of said fourth bed while same is receiving feed gas, and the aforedescribed steps are consecutively followed with the second, third and fourth beds in accordance with the flow cycle sequence of FIG. 5.

5. An adiabatic pressure swing process according to claim 1 with three adsorption beds wherein said first bed is initially at said lowest superatmospheric pressure and purged of nitrogen adsorbate, feed air and oxygen gas are simultaneously introduced respectively to the first bed inlet end and discharge end initially at said highest superatmospheric pressure of 40-70 psia. and oxygen gas is simultaneously released from the discharge end of a third bed initially at said highest superatmospheric pressure and one part thereof discharged as product and the balance returned to the first bed discharge end for such simultaneous introduction with the gas flows continued until the first and third beds are first higher pressure equalized, the introduction of feed air to the first bed inlet end is continued after terminating the oxygen gas introduction to the discharge end until the first bed is repressurized to said highest superatmospheric pressure, oxygen is thereafter released from the repressurized first bed discharge end with one part thereof discharged as product and the balance returned to the discharge end of a partially repressurized second bed for simultaneous introduction during feed air introduction to the second bed inlet end until the first and second beds are first higher pressure equalized, the first bed is cocurrently depressurized to 16 – 32 psia. with one part of the oxygen discharged as product and the balance returned to the third bed discharge end during the first part of such cocurrent depressurization for purging of nitrogen adsorbate therefrom and thereafter returned to the third bed discharge end until the first and third beds are second lower pressure equalized, the first bed is thereafter countercurrently depressurized, oxygen from a cocurrently depressurizing second bed is returned to the first bed discharge end for purging thereof, and the aforedescribed steps are consecutively followed with the second and third beds in accordance with the flow cycle sequence of FIG. 8, the oxygen mass relationship of feed gas oxygen : oxygen gas from the first through third bed discharge ends : oxygen return gas being 1:5 – 9.5: 4 – 9.1.

* * * * *

UNITED STATES PATENT OFFICE
CERTIFICATE OF CORRECTION

Patent No. 3,717,974     Issue Date February 27, 1973

Inventor(s) L. B. Batta

It is certified that error appears in the above-identified patent and that said Letters Patent are hereby corrected as shown below:

Claim 1, col. 20, lines 57-58, delete "before reintroduction of said feed air to the inlet end".

Column 2, lines 36 and 27, cancel "before reintroduction of fee air"

Signed and sealed this 26th day of March 1974.

(SEAL)
Attest:

EDWARD M. FLETCHER, JR.
Attesting Officer

C. MARSHALL DANN
Commissioner of Patents